(12) United States Patent
Miller et al.

(10) Patent No.: US 9,037,299 B2
(45) Date of Patent: May 19, 2015

(54) METHOD FOR PREDEFINING AN OPERATING POINT OF A DRIVE MACHINE OF A DRIVE SYSTEM

(75) Inventors: Matthias Miller, Steinhausen (DE); Horst Wagner, Niederstotzingen (DE); Heinz Hense, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 639 days.

(21) Appl. No.: 13/228,802

(22) Filed: Sep. 9, 2011

(65) Prior Publication Data

US 2012/0089255 A1    Apr. 12, 2012

(30) Foreign Application Priority Data

Sep. 9, 2010   (DE) .................... 10 2010 044 906

(51) Int. Cl.
| | | |
|---|---|---|
| G05D 17/00 | (2006.01) | |
| B60W 30/188 | (2012.01) | |
| B60W 10/06 | (2006.01) | |
| B60W 10/103 | (2012.01) | |
| B60W 10/30 | (2006.01) | |

(52) U.S. Cl.
CPC ........... B60W 30/1882 (2013.01); B60W 10/06 (2013.01); B60W 10/103 (2013.01); B60W 10/30 (2013.01)

(58) Field of Classification Search
None
See application file for complete search history.

(56) References Cited

U.S. PATENT DOCUMENTS

| | | | | |
|---|---|---|---|---|
| 8,297,068 | B2 * | 10/2012 | Yokouchi et al. ............... 62/239 | |
| 2002/0123836 | A1 | 9/2002 | Komiyama et al. | |
| 2004/0000206 | A1 * | 1/2004 | Beale ................................ 74/150 |
| 2004/0090195 | A1 * | 5/2004 | Motsenbocker ............... 318/109 |
| 2006/0037573 | A1 * | 2/2006 | Iwatsuki et al. ............ 123/179.4 |
| 2007/0227137 | A1 | 10/2007 | Naruse |
| 2008/0046155 | A1 * | 2/2008 | Holthaus et al. ................ 701/51 |
| 2008/0091313 | A1 * | 4/2008 | Mann et al. ...................... 701/22 |
| 2009/0118919 | A1 * | 5/2009 | Heap et al. ....................... 701/54 |
| 2009/0137363 | A1 * | 5/2009 | Leibbrandt et al. ............ 477/109 |
| 2009/0258755 | A1 * | 10/2009 | Kimura et al. ................. 477/107 |
| 2013/0073134 | A1 * | 3/2013 | Yokouchi et al. ............... 701/22 |

FOREIGN PATENT DOCUMENTS

| | | |
|---|---|---|
| DE | 10 2006 055 725 A1 | 5/2008 |
| DE | 10 2007 062 888 A1 | 7/2009 |
| EP | 0 901 928 A2 | 3/1999 |
| EP | 1 655 469 A1 | 5/2006 |
| EP | 1 754 643 | 2/2007 |
| WO | WO 2011155024 A1 * | 12/2011 |

* cited by examiner

Primary Examiner — Ryan Jarrett
(74) Attorney, Agent, or Firm — Maginot, Moore & Beck LLP

(57) ABSTRACT

A method for predefining an operating point of a drive machine of a drive system, including the drive machine and at least two loads which are driven by the drive machine is disclosed. The method includes the following steps: (i) identification of in each case one instantaneous load power demand of the at least two loads, (ii) determination of at least one partial request point of the drive machine for each identified load power demand in order to meet the respective load power demand, (iii) determination of at least one overall request point of the drive machine on the basis of the specific partial request points, (iv) determination of a cost variable of the drive machine for the at least one overall request point, and (v) selection of the operating point taking into account the cost variable and predefining of the operating point.

12 Claims, 3 Drawing Sheets

METHOD FOR PREDEFINING AN OPERATING POINT OF A DRIVE MACHINE OF A DRIVE SYSTEM

This application claims priority under 35 U.S.C. §119 to German patent application no. DE 10 2010 044 906.7, filed Sep. 9, 2010 in Germany, the disclosure of which is incorporated herein by reference in its entirety.

BACKGROUND

The present disclosure relates to a method for predefining an operating point of a drive machine of a drive system, comprising the drive machine and at least two loads which are driven by the drive machine.

Features of the disclosure are described essentially with reference to drive systems in which at least one load comprises a hydrostatic drive. Diesel engines or electric motors are usually used as drive machines for driving hydrostatic drives. The hydrostatic drive usually comprises a hydrostatic pump which is driven by the drive machine, and a hydrostatic motor which is connected thereto.

Conventional hydrostatic drives are configured for the rated power point of the internal combustion engine and therefore have a non-optimal efficiency level in the partial load range. It is known to reduce the rotational speed of the internal combustion engine in the partial load range in order thus to improve the overall efficiency level. EP 1 754 643 A1 describes a further method for optimizing the overall efficiency level with which, however, only a single hydrostatic load can be controlled in a restricted load range.

It is therefore desirable to improve the actuation of the drive machine of a drive system which is mentioned in the introduction in order also to optimize the efficiency level for more than one load.

SUMMARY

A method for predefining an operating point of a drive machine of a drive system having various features are set forth below. Advantageous refinements of the method are also set forth below.

The disclosure relates to a method with which, when there are different power requests of different loads, an optimal operating point can be determined for the drive machine. In this context, a partial request point is determined for each load, for example a torque is determined as a function of a rotational speed of the drive machine or an output power of the load is determined together with an efficiency level of the power transmission, in order to make available a necessary working power (setpoint state or actual state). The determination is expediently carried out on the basis of a load model in a computing unit (usually control unit). One or more partial request points—if appropriate also at least one interval—which are sufficient to cover the respective power demand are obtained as a function of the specific load. As a result of the general determination of a partial request point, there is, in particular, no restriction of the disclosure to hydrostatic drives as loads.

All the power requests or partial request points are linked in order to specify at least one overall request point, for example an overall torque plotted over a common rotational speed range. As previously mentioned, this may also involve one or more points and/or ranges.

The at least one overall request point is compared with a maximum power which can be output by the drive machine in order to determine an intersecting set. At least one operating point at which the drive machine is capable of outputting the overall request is determined. For example an output rotational speed range is determined in which the drive machine is capable of outputting the overall torque. A cost variable or consumption variable, for example fuel or electrical energy, emissions of pollutants or noise, service life and the like, which is necessary for outputting the overall request is determined for the output rotational speed range. The operating point with the lowest costs is then preferably predefined, wherein the predefinition of the operating point occurs, in particular, by predefining the associated rotational speed. The determination of the cost variable can take place in a drive machine model. In addition to the optimum overall efficiency level, other criteria, such as for example a power reserve, in order to be able to react quickly to dynamic requests, further internal-combustion-engine requests, for example for rapid warming up, and service life criteria can also be taken into account for the selection of the operating point, in order to avoid high pressures occurring too frequently in the hydraulic system, etc.

Features of the disclosure provide the possibility of performing optimization of an overall efficiency level even when there are a plurality of loads (also different loads). The optimization can take place at all the operating points and for all the load requests. A modular design permits a distributed computing unit topology and assists easy implementation even when there are different variants of drive systems. The method according to the disclosure makes it possible to include all the loads (simultaneously) in the optimization. The drive machine is advantageously actuated in such a way that the requests of the loads which occur simultaneously are met at the minimum cost.

A drive system can comprise a series of loads, such as for example a locomotion drive, working hydraulic system, generator (dynamo), fan drive, air conditioning system etc. Each of these loads requires a certain amount of power which it usually taps indirectly or directly as a product of the torque and rotational speed from the crankshaft of the drive machine. In certain operating situations (for example hydrostatic braking), a torque can also be fed back to the crankshaft from the loads. This torque can then be subtracted from the torque which is to be applied overall.

It is expedient if an optimum internal setting is already taken into account in the identification of the instantaneous power demand of a load if the load has degrees of freedom in the representation of the required operating state. For this purpose, the method according to the disclosure can be applied hierarchically. In the case of a hydrostatic locomotion drive, a degree of freedom may be present if both the pump angle and motor angle can be selected. In this case, a setting of the pump angle and of the motor angle should be firstly preselected with a particularly high efficiency level.

A computing unit according to the disclosure, for example a control device of a drive system, is configured, in particular in terms of program technology, to carry out a method according to the disclosure. The computing unit can, in particular, also comprise a number of distributed partial computing units, on each of which parts of the method according to the disclosure are carried out. For example, each load can be equipped with a separate partial computing unit which carries out the calculations relating to the respective load and transmits the result, for example, to a further partial computing unit which is responsible for the linking and evaluation.

The implementation of features of the disclosure in the form of software is also advantageous since this permits particularly low costs, in particular if a computing unit which runs the software is also used for other tasks and is therefore present in any case. Suitable data carriers for making available the computer program are, in particular, diskettes, hard disks, flash memories, EEPROMs, CD-ROMs, DVDs and the like. It is also possible to download a program via computer networks (Internet, Intranet etc).

Further advantages and refinements of the disclosure emerge from the description and the appended drawing.

Of course, the features which are mentioned above and the features which are still to be explained below can be used not only in the respectively specified combination but also in other combinations or alone without departing from the scope of the present disclosure.

Features of the disclosure are illustrated schematically in the drawing using exemplary embodiments and will be described in detail below with reference to the drawing.

DETAILED DESCRIPTION

Figure 1:
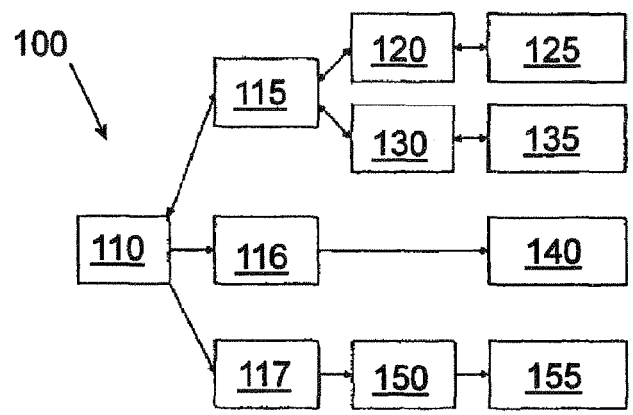
FIG. 1 shows a schematic view of a drive system such as can form the basis of the disclosure.

FIG. 1 is a schematic illustration of a drive system such as can form the basis of the disclosure, and it is denoted in its entirety by 100. The drive system can be embodied, for example, as a mobile working machine. The drive system 100 comprises a drive machine which is embodied, for example, as an internal combustion engine 110, and a number of loads 120, 130, 140 and 150.

A hydrostatic drive unit 120 and a working hydraulic pump 130 are connected to the internal combustion engine 110, for example via a distributor gear mechanism 115. The hydrostatic working unit 120 is provided for the propulsion of the drive system 100 and for this purpose interacts with a corresponding gear mechanism 125. The working hydraulic pump 130 is provided for processing and for this purpose interacts with corresponding actuating cylinders 135.

The internal combustion engine 110 is also connected via a belt drive 116 to an air-conditioning system 140.

Finally, the internal combustion engine 110 is connected via a secondary output (PTO) 117 to a generator 150 for generating electrical energy. Electrical loads 155 are connected to the generator 150.

In a refinement of disclosure there may be provision for the physical power flux within the drive system 100 to be modeled, as is explained below with reference to FIG. 2.

Figure 2:
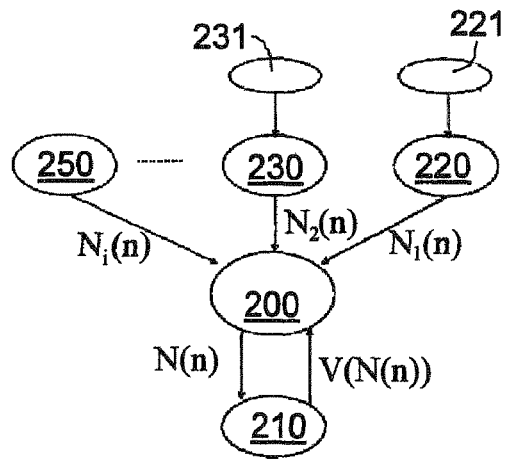
FIG. 2 shows an embodiment of the disclosure using a flowchart.

FIG. 2 is a schematic illustration of an embodiment of the disclosure. In this implementation, each actually present load 120, 125; 130, 135; 140; 150, 155 is expediently assigned a model 220, 230, 240, for example a "drive train" model 220 for the locomotion drive 120, 125 of the working machine 100, a model 230 for the working hydraulic system 130, 135, a model 250 for a fan drive 150, 155 etc. Input variables can be fed to the individual models. For example, an accelerator pedal position 221 can be fed to the "drive train" model 220, and a joystick position 231 can be fed to the "working hydraulic system" model 230, these being respectively predefined by the driver of the working machine.

The optimization of the efficiency level gives rise to free selection of the rotational speed of the internal combustion engine and of the hydraulic actuators within the limits which are given by operator predefinitions and other power-requesting functions. For this reason there is provision for the customary direct coupling between the operator control element (accelerator pedal, joystick . . . ) and the actuators (diesel injection pump, pivoting angle of the axial piston machines) to be released. Instead, the operator control element is interpreted as being a means of predefining a mechanical variable of the working unit/drive unit. It is therefore possible, for example, for the position of the accelerator pedal (angle) to be mapped onto a vehicle speed or driving power.

Each model 220, 230 etc. identifies the respective power demand. In particular, one or more partial request points are determined. An advantageous implementation of the power request is to form the torque demand by means of the rotational speed of the internal combustion engine 110, as is explained later with respect to FIG. 3. The respective partial torque demand $M_i(n)$ plotted over the rotational speed n is transmitted from the models 220, 230 etc. to a coordinator 200 which links the requests and evaluates them. For example, the coordinator generates a main torque request $M(n)$ plotted over the rotational speed n and transmits said request to a model 210 of the internal combustion engine 110. The model 210 determines, for the main torque request $M(n)$, a cost variable, in the present example a fuel consumption value, for the operating points at which the internal combustion engine 110 is capable of outputting the requested main torque $M(n)$. The rotational-speed-dependent or operating-point-dependent consumption $V(M(n))$ is transmitted from the model 210 to the coordinator 200 which, on this basis, selects a rotational speed $n_0$ with a suitable efficiency level and predefines it to the internal combustion engine 110. In addition to the efficiency level and consumption, other variables, such as have already been explained further above, can also be taken into account in the selection of a suitable rotational speed.

Alternatively (but not illustrated), the requests comprise an output power of the load and an efficiency level of the power transmission to the load. The coordinator then determines the overall power which is to be applied, on the basis of the partial power values and efficiency levels.

Figure 3:
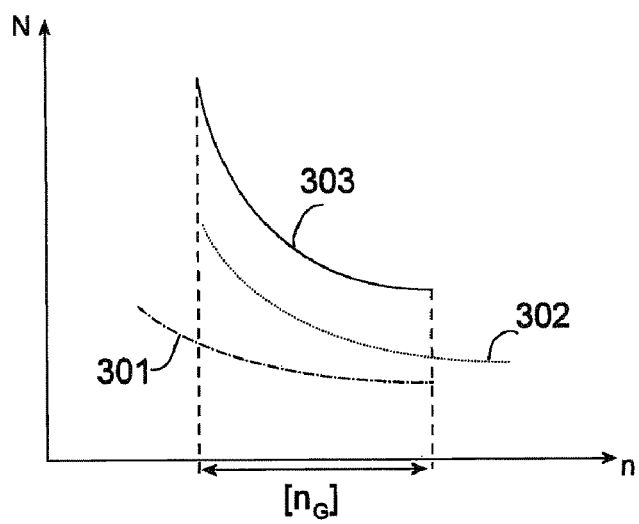
FIG. 3 shows two partial torque requests and one main torque request plotted over the rotational speed.

FIG. 3 illustrates, inter alia, partial torque requests M plotted over the rotational speed n, such as are supplied to the coordinator 200 by, for example, the models 220, 230 etc. according to FIG. 2. For example, a first torque request 301 is supplied by the drive train model 220, and a second torque request 302 is supplied by the working hydraulic system model 230. The coordinator 200 links these partial torque requests 301, 302 to form a main torque request 303. According to the embodiment illustrated here, the main torque request 303 is a sum of the individual partial torque requests 301 and 302 plotted over the common rotational speed range $[n_G]$ as an intersecting set of the individual rotational speed ranges. The coordinator 200 passes on this main torque request 303 plotted over the common rotational speed range $[n_G]$ to the model 210 of the internal combustion engine.

Figure 4:
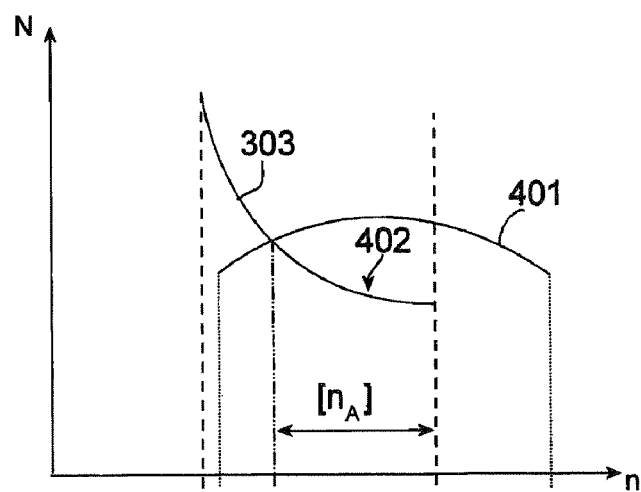
FIG. 4 shows the main torque request according to FIG. 3 and a torque output of a drive machine plotted over the rotational speed.

FIG. 4 illustrates in a diagram not only the main torque request 303 according to FIG. 3 but also a possible output torque 401 of the internal combustion engine 110. The output torque 401 plotted over the rotational speed n describes the maximum torque which can be generated by the internal combustion engine 110 at each rotational speed. In one refinement, the output torque 401 is also determined by the model 210 of the internal combustion engine and transferred to the coordinator 200. The coordinator links and compares the main torque request 303 with the possible torque output 401 and determines therefrom an output rotational speed range [$n_A$] in which the internal combustion engine 110 is capable of outputting the requested torque 303. In this way, a range or a set of rotational speeds 402 plotted over the output rotational speed range [$n_A$] which are suitable for meeting the power request is obtained.

In the embodiment of the disclosure which is described here, the operating points comprising the torques 402 plotted over the output rotational speed range [$n_A$] are again transferred to the model 210 of the internal combustion engine 110 so that the latter determines the associated cost variable. In this context, a cost variable, in particular a fuel consumption value (liter/hour), is identified for all the possible operating points (rotational speed+torque). The minimum of the consumption curve defines the machine operating state which is optimal for consumption. The coordinator 200 selects a suitable rotational speed $n_0$ in the permissible output rotational speed range [$n_A$] and predefines this to the internal combustion engine and, if appropriate, to the other loads. As mentioned, in addition to the optimal overall efficiency level further criteria can be taken into account in the selection of the operating points. These are, in particular, a power reserve, service life criteria, internal-combustion-engine requests and the like.

Figure 5:
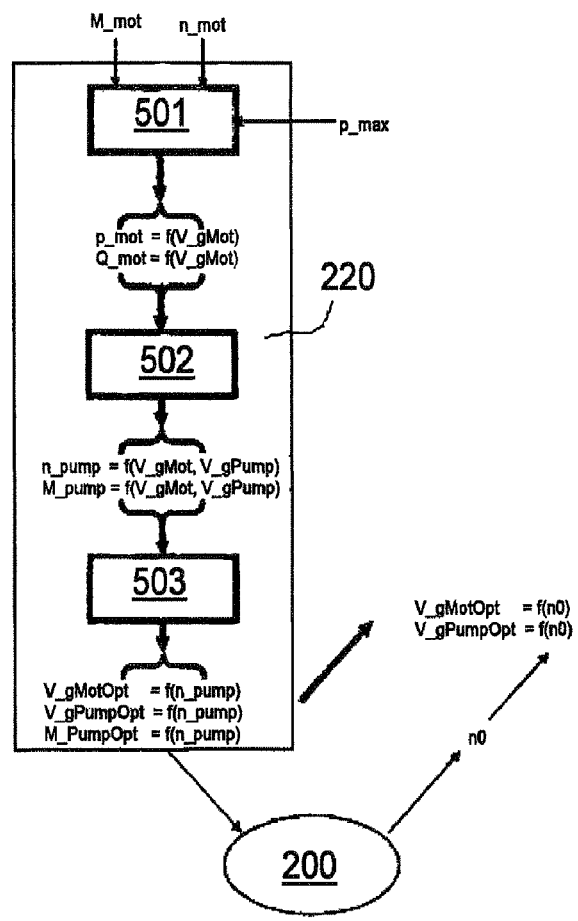
FIG. 5 shows, for example, a possible way of determining a torque request using a flowchart.

The disclosure will now be explained in more detail using the example of the "drive train" model with reference to FIG. 5 in which a preferred embodiment of the model 220 according to FIG. 2 is illustrated in more detail.

A model 501 calculates from the given mechanical load point (M_mot, n_mot) at the hydrostatic motor the possible hydraulic variables p_mot (pressure gradient at the motor) and Q_mot (volume flow at the inlet of the motor) taking into account the maximum permissible pressure p_max. In this context, the efficiency level of the hydrostatic motor for the various operating points is taken into account. The hydraulic variables can optionally be transferred to a line model in order, for example, to take into account flow losses.

The hydraulic variables are then transferred to a pump model 502 which identifies all the possible mechanical states (rotational speed n_pump, torque M_pump) at the hydrostatic pump as a function of the draining volume (V_gPump) and the absorption volume (V_gMot), with the result that the load point is implemented at the hydrostatic motor.

An internal optimizer 503 selects, from all the possible V_gMot/V_gPump combinations, those (V_gMotOpt, V_gPumpOpt) which have the best hydrostatic efficiency level at a given pump rotational speed n_pump. The necessary pumping torque M_pumpOpt plotted over the rotational speed is transferred to the coordinator 200.

As already mentioned above, the coordinator uses the internal combustion engine model 210 to select an operating point or a rotational speed n0 which is predefined. In a development of the disclosure, for example a position regulator identifies the setpoint values for the pivoting angles of the hydrostatic motor and pump from the pump rotational speed n0 and the variables V_gMotOpt, V_gPumpOpt.

In the case of a negative power request of the load, the described algorithm can be used equivalently. For example, in the case of a locomotion drive, a negative power request occurs if the driver takes his foot off the accelerator and the vehicle coasts to a standstill. Depending on the haptics desired, a braking effect which is as large or as small as possible may be aimed for by the locomotion drive.

If the locomotion drive is to have a braking effect which is as small as possible, the hydrostatic drive unit is optimized as explained above.

The internal combustion engine model must be able to describe the drag torque of the internal combustion engine, even when the engine brake is used (pressure flap in the exhaust, valve extraction etc.). Instead of load information, the internal combustion engine model outputs a different suitable cost function. The latter can be, for example, the deviation between the required drag torque and the available drag torque:

K_Diesel=$f$(n_pump)=M_pumpOpt(n_pump)−M_Diesel(n_pump)

On the basis of the cost function, the operating point coordinator selects the state (rotational speed). the optimum is determined by the minimum of K_Diesel.

If the locomotion drive is to have a braking effect which is as large as possible, the hydrostatic drive is likewise optimized essentially equivalently. However, the optimizer which is used must aim at the lowest hydrostatic efficiency level. In this application case, the optimization is defined by the maximum of the cost function K_Diesel.

The disclosure will be explained below in more detail on the basis of a number of examples of load models, wherein first a fan which is driven by a hydrostatic drive will be considered. The decisive factor here is firstly the requested fan rotational speed $n_L$, which is predefined, for example, by a cooling water control system.

The torque demand $M_L$ of the fan is, in a good approximation, dependent only on its rotational speed $n_L$ and can simply be calculated as $M_L = C_L n_L^2$. $C_L$ is a constant which is characteristic of the specific fan.

If the fan is driven directly by a hydrostatic constant motor with the rated volume $V_{gMot}$, the fan rotational speed is equal to the rotational speed of the hydraulic motor and the fan torque is equal to the torque of the hydraulic motor. The required (differential) oil pressure $p_{Hyd}$ and the oil flow $q_{Hyd}$ can be calculated therefrom as:

$$q_{Hyd} = \frac{V_{gMot} \cdot n_L}{1000 \cdot \eta_{vMot}}; \; p_{Hyd} = \frac{M_L \cdot 20 \cdot \pi}{V_{gMot} \cdot \eta_{mhMot}}$$

where $\eta_{vMot}$: is a volumetric efficiency level of the hydraulic motor $\eta_{mhMot}$: is the mechanical/hydraulic efficiency level of the hydraulic motor.

If the hydraulic motor is fed exclusively by an adjustment pump with the volume $V_{gPump}$, the rotational speed $n_{pump}$ and torque $M_{pump}$ at the pump are calculated from the given variables of the oil pressure $p_{Hyd}$ and oil flow $q_{Hyd}$. The calculation is expediently carried out for every $V_{gPump}$ in the interval [$V_{gPumpMin}$, $V_{gPumpMax}$], i.e., $n_{pump}$ and $M_{pump}$ are generally not individual values but rather functions of the variable $V_{gPump}$:

$$n_{Pump}(V_{gPump}) = \frac{q_{Hyd} \cdot 1000}{V_{gPump} \cdot \eta_{vPump}}; \; M_{Pump}(V_{gPump}) = \frac{V_{gPump} \cdot p_{Hyd}}{20 \cdot \pi \cdot \eta_{mhPump}}$$

where $$V_{gPumpMin} = \frac{q_{Hyd} \cdot 1000 \cdot \eta_{vPump}}{n_{PumpMax}}; \; V_{gPumpMax} = V_{gPumpNenn}$$

By conversion and insertion the following function $M_{pump}(n_{pump})$ is obtained:

$$M_{Pump}(n_{Pump}) = \frac{q_{Hyd} \cdot 50 \cdot p_{Hyd}}{n_{Pump} \cdot \eta_{vPump} \cdot \pi \cdot \eta_{mhPump}}$$

This function corresponds to a power hyperbola on which the efficiency level of the hydrostatic fan drive is superimposed.

If the hydraulic pump is in turn driven directly by the diesel engine, the rotational speed of the hydraulic pump is equal to the rotational speed of the diesel engine, and the torque of the hydraulic pump is subtracted, weighted by the factor 1, at the diesel engine as a partial torque which is to be applied. The function $M_{pump}(n_{pump})$ is, as explained for example above with respect to FIG. 2, transferred to the operating point coordinator. The latter coordinates the request with concurrent requests from other loads and transfers the coordinated overall value to a diesel engine model. Afterwards, the diesel engine rotational speed $n_{DieselSet}$ (or n0) is predefined taking into account a cost variable.

For the given diesel engine rotational speed (and therefore also the pump rotational speed $n_{pumpSet}$) the required volume $V_{gPumpSet}$ of the pump can be determined as:

$$V_{gPumpSet} = \frac{q_{Hyd} \cdot 1000}{n_{PumpSet} \cdot \eta_{vPump}}$$

This can then be converted into suitable actuation of the pump.

The model of a reciprocating cylinder, for example in the case of a forklift truck, will be described as a further example. The desired lifting speed $v_{Zyl}$ is calculated from a deflection $a_{JS}$ of the joystick. The oil flow $q_{Hyd}$ is calculated together with the area $A_{Zyl}$ of the hydraulic cylinder and the volumetric efficiency level $\eta_{vZyl}$.

$$v_{Zyl} = f(\alpha_{JS}); \quad q_{Hyd} = \frac{v_{Zyl} \cdot A_{Zyl}}{\eta_{vZyl}}$$

If the cylinder is fed exclusively by an adjustment pump with the volume $V_{gPump}$, a function $M_{pump}(n_{pump})$ can be calculated like before from the known variables of the oil pressure $p_{Hyd}$ and oil flow $q_{Hyd}$ from:

$$n_{Pump}(V_{gPump}) = \frac{q_{Hyd} \cdot 1000}{V_{gPump} \cdot \eta_{vPump}}; \quad M_{Pump}(V_{gPump}) = \frac{V_{gPump} \cdot p_{Hyd}}{20 \cdot \pi \cdot \eta_{mhPump}}$$

where $$V_{gPumpMin} = \frac{q_{Hyd} \cdot 1000 \cdot \eta_{vPump}}{n_{PumpMax}}; \quad V_{gPumpMax} = V_{gPumpNenn}.$$

What is claimed is:

1. A method for predefining an operating point of a drive machine of a drive system having the drive machine and at least two loads which are driven by the drive machine, comprising:

identifying in each case one instantaneous load power demand of the at least two loads;

determining at least one partial request point of the drive machine for each identified load power demand in order to meet the respective load power demand, wherein the at least one partial request point for each identified load power demand each respectively include a partial torque and a rotational speed;

determining at least one overall request point of the drive machine on the basis of the specific partial request points;

determining a cost variable of the drive machine for the at least one overall request point; and selecting an operating point from a plurality of operating points that satisfy the at least one overall request point taking into account the cost variable and predefining the operating point as the selected operating point.

2. The method according to claim 1, wherein at least one possible operating point of the drive machine is determined at which the drive machine is capable of meeting the overall request point, and the operating point is selected from the possible operating points.

3. The method according to claim 1, wherein the predefining of the operating point comprises predefining of a rotational speed.

4. The method according to claim 1, wherein the at least one partial request point includes a partial output power or overall output power and the associated efficiency level of the power transmission.

5. The method according to claim 1, wherein the at least one overall request point includes a partial torque or overall torque and a rotational speed.

6. The method according to claim 5, wherein the determination of the at least one overall request point comprises the determination of an overall torque as a function of the rotational speed over a common rotational speed range.

7. The method according to claim 6, wherein the common rotational speed range is determined as an intersecting set of the individual rotational speed ranges.

8. The method according to claim 6, wherein a maximum torque which can be generated by the drive machine is determined by the rotational speed and is compared with the overall torque, wherein on the basis of the comparison an output rotational speed range in which the drive machine is capable of outputting the overall torque is determined.

9. The method according to claim 8, wherein the cost variable of the drive machine is determined only for the output rotational speed range.

10. The method according to claim 6, wherein the overall torque is determined as a sum of the individual partial torques.

11. The method according to claim 1, wherein the at least one overall request point includes a partial output power or overall output power and the associated efficiency level of the power transmission.

12. A drive system comprising:
a drive machine;
at least two loads driven by said drive machine; and
a computing unit which is configured to execute instructions to carry out the method according to claim 1.

* * * * *